March 14, 1961  J. L. TUTTLE ET AL  2,974,970
VEHICLE FOR TRANSPORTING AND STORING LIQUIDS
Filed May 29, 1957  3 Sheets-Sheet 1

*INVENTOR.*
JACK L. TUTTLE
BY WILLIAM M. PHILLIPS

ATTORNEY

March 14, 1961  J. L. TUTTLE ET AL  2,974,970
VEHICLE FOR TRANSPORTING AND STORING LIQUIDS
Filed May 29, 1957  3 Sheets-Sheet 2
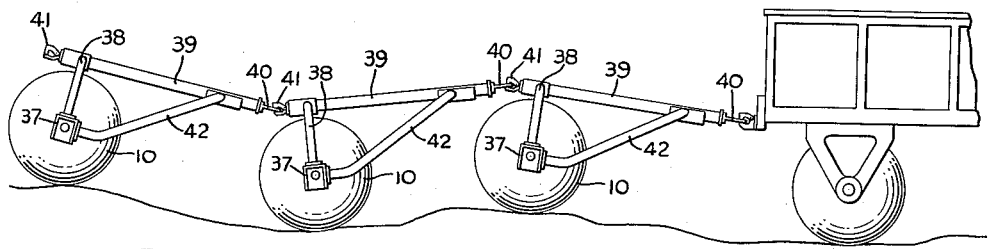
FIG. 3
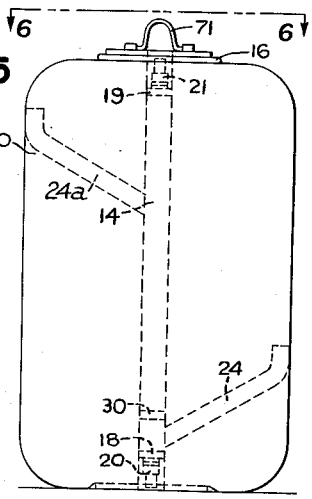
FIG. 5
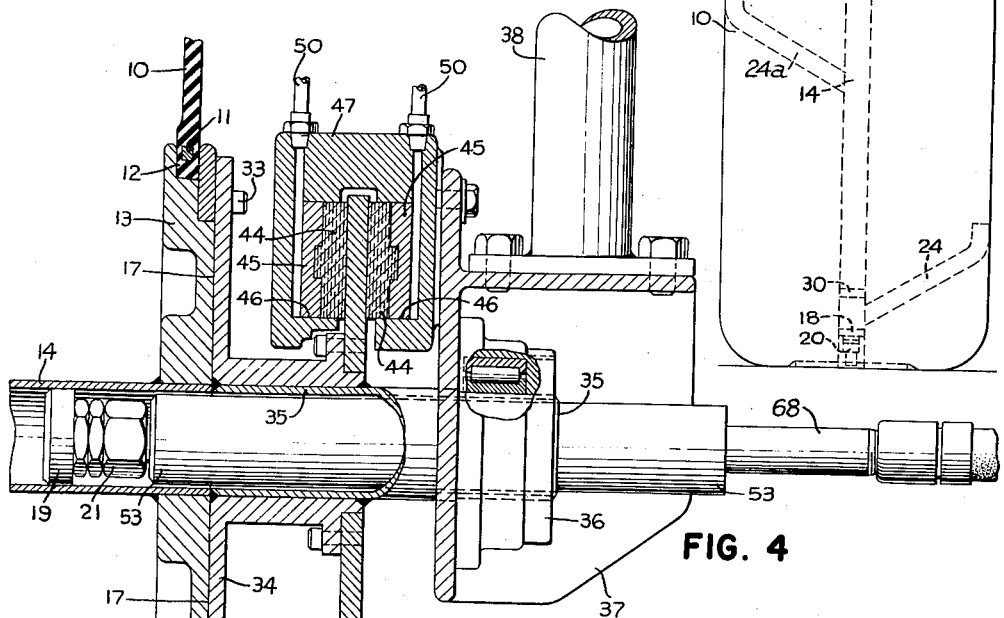
FIG. 4
FIG. 6
INVENTOR.
JACK L. TUTTLE
WILLIAM M. PHILLIPS
BY
*R. L. Miller*
ATTORNEY

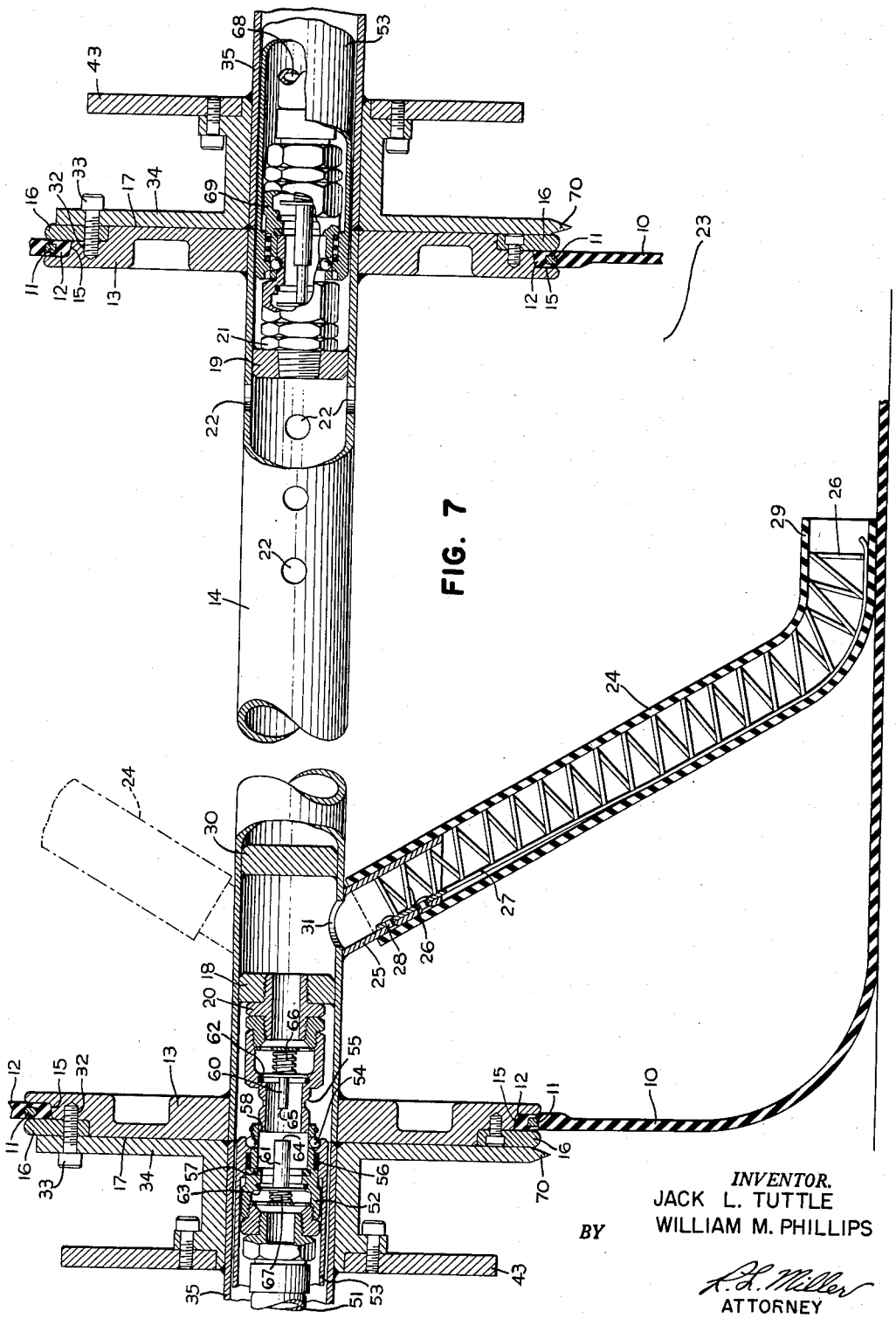

United States Patent Office 2,974,970
Patented Mar. 14, 1961

2,974,970

VEHICLE FOR TRANSPORTING AND STORING LIQUIDS

Jack L. Tuttle, Cuyahoga Falls, and William M. Phillips, Akron, Ohio, assignors to The Goodyear Tire & Rubber Company, Akron, Ohio, a corporation of Ohio Filed May 29, 1957, Ser. No. 662,400

6 Claims. (Cl. 280—5)

This invention relates to a vehicle for transporting liquids and more particularly to a vehicle for transporting liquids having a large liquid capacity and which when fully loaded has a low ground-contacting pressure so that the vehicle may be pulled over otherwise impassable terrain.

During many civilian and military operations at construction projects, remote aircraft landing fields, amphibious landing, etc. it is necessary to transport fuel and other liquids from a central depot to isolated locations which can only be reached by passage over soft, rocky, swampy, sandy, snowy, etc. terrain. In the conventional methods of transporting fuel during the above operations, the fuel is either transported in a conventional tank truck or placed in steel drums or collapsible containers such as shown in United States Patents 2,612,924 and 2,672,902 and the loaded containers are transported to the desired location in trucks or other conventional vehicles so that it is extremely difficult, and often impossible, to transport the fuel during the aforesaid operations.

An object of this invention is to provide a vehicle for transporting liquid having a large fluid capacity which may be moved over otherwise impassible terrain and which requires a relatively small pulling or draft force.

A further object of the invention is to provide a vehicle of the character described having a self-contained filling and emptying device.

Another object of the invention is to provide vehicles of the character described having towing frames which may be connected in tandem and having brakes which may be actuated simultaneously.

An additional object of the invention is to provide a vehicle of the character described having flush sidewalls to which a towing frame is removably attached whereby the frame may be transported independently of the vehicle.

Other objects and advantages of this invention will be apparent to those skilled in the art by reference to the following description of the invention in conjunction with the accompanying drawings wherein:

Fig. 3 is a side elevation of several vehicles connected in tandem and to a drafting truck;

Fig. 4 is an enlarged partial sectional view taken along the lines 4—4 of Fig. 1;

Fig. 5 is an elevational view of the vehicle detached from the towing frame;

Fig. 6 is a side view taken along the line 6—6 of Fig. 5;

Fig. 7 is a side elevational view of the vehicle in filling position with parts broken away.

Figure 1:
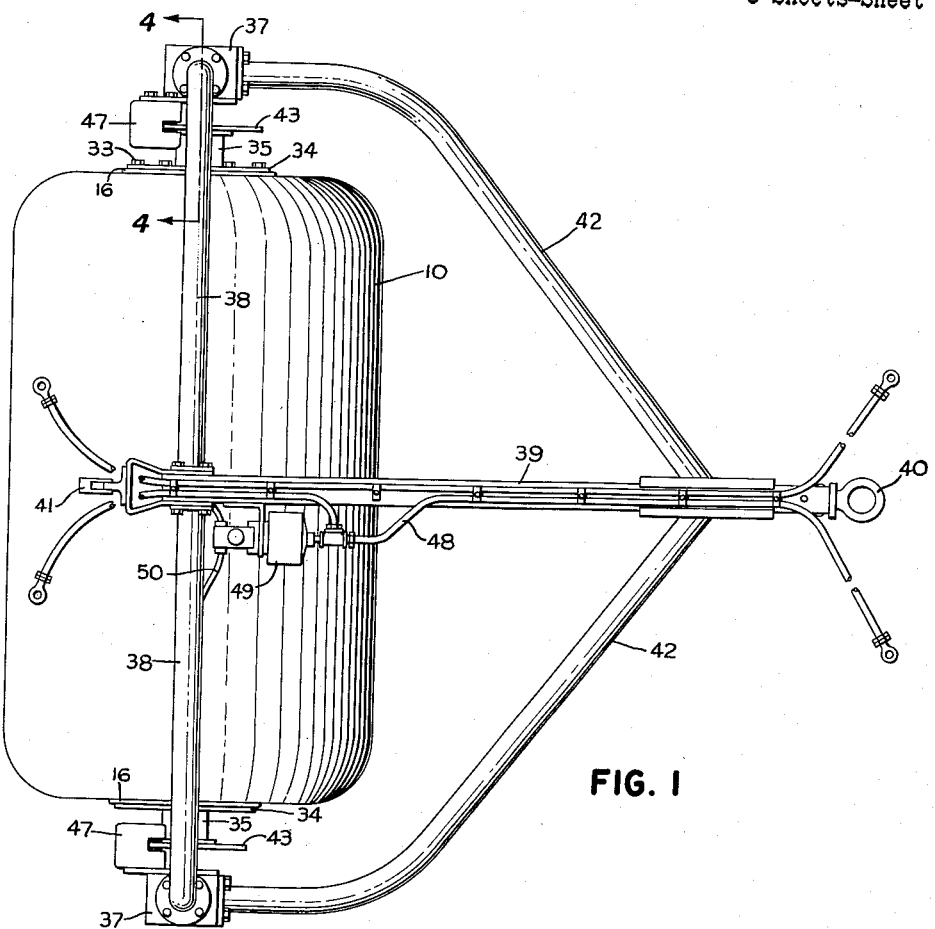
Fig. 1 is a plan view of the vehicle.

Referring to the drawings, the vehicle of this invention comprises a cylindrical body 10 formed of a plurality of rubberized cord fabric, each ply being positioned so that the cords extend helically about the body and form a large acute angle relative to the longitudinal axis thereof. The cords of each of the plies are turned about metallic rings 11 located in the beads 12 of the body 10. The diameter of the beads 12 is substantially less than the axial distance between the beads so that the body has a relatively large liquid capacity which may vary in size from a capacity of a few hundred to several thousand gallons.

The walls of the body 10 are preferably stiff enough to cause the container to stand alone when empty but preferably the body is flexible enough to enable it to be collapsed and folded when empty so they may be stacked for shipment to the point of use.

Preferably the body 10 has a thick film of rubber on its inner face to provide a liquid tight liner. The film may be formed of ordinary rubber, or a synthetic rubber which is selected for its resistance to the destructive action of the liquid to be shipped. "Buna-N" may be used for the liner in a vehicle body 10 which is to contain petroleum, whereas, for shipping many other liquids a "neoprene" liner may be desired.

It is seen that the cylindrical body 10 functions as both a container to retain the liquid to be transported and as a tire to support the load of the vehicle so that the body 10 may be provided with a tread on its outer cylindrical surface to increase the traction thereof and to increase the resistance to wear.

The cylindrical body, container, or tire 10 is mounted upon an axle assembly comprising a pair of flanges 13 which project radially outward from each end of the main axle 14. The outer periphery of the flanges 13 is provided with an annular groove 15 into which the beads 12 of the cylindrical body 10 are positioned. An annular ring 16 is secured to the flange 13 to lock the beads 12 of the cylindrical body 10 to the flanges 13.

Figure 2:
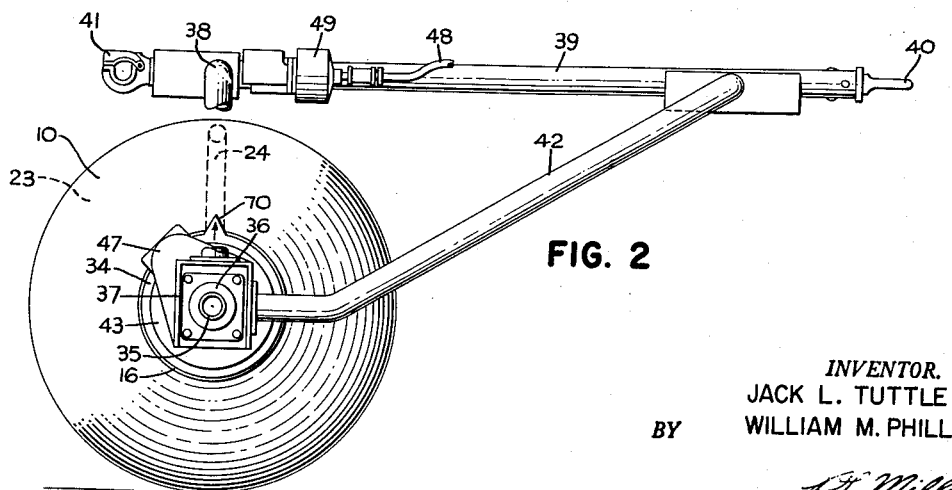
Fig. 2 is a side elevational view of the vehicle.

The main axle 14 terminates flush with the outboard or axially outer surface 17 of the flanges 13 and is provided with a pair of plugs 18 and 19 into which are secured respectively a valve nipple 20 and 21 terminating inboard of the surfaces 17 of the flanges 13. The construction and function of the valve nipples 20 and 21 will be described more in detail hereinafter. Referring specifically to Fig. 7 of the drawings, the axle is further provided with a plurality of holes 22 which permits liquid which is pumped through the valve or valve nipple 21 to enter into the chamber 23 formed by the cylindrical body 10 and flanges 13. During the filling operation air is allowed to vent out of the chamber 23 through the flexible hose 24 which is connected to a metallic nipple 25 welded to the axle 14. The flexible hose 24 is provided with a helical spring 26 to prevent the hose from collapsing during the emptying operation and a flat leaf spring 27 is positioned within the hose 24 and secured to the nipple 25 by means of suitable fasteners 28. The leaf spring 27 urges the rubber hose 24 radially outwardly relative to the axle 14 so that the extreme outer end 29 of the hose 24 bears against the inner surface of the cylindrical body 10. During the filling operation the cylindrical body 10 is rotated so that the outer end 29 of the hose is positioned in the uppermost portion of the chamber 23 as shown in Fig. 2 of the drawings. As indicated above, air is vented through the hose 24 and valve or valve nipple 20 as liquid is injected into the body through the valve 21 and holes 22. A suitable plug 30 is secured within the axle 14 to isolate the orifice 31 communicating with the hose 24 from the holes 22 which communicate with the valve 21.

The outer surfaces 17 of the flanges 13 are provided with a plurality of threaded holes 32 for receiving studs 33 which removably secure the flange 34 of the stub axle 35 to the axle assembly. The outer end of the stub axle 35 is journaled within bearings 36 supported in the brackets 37 which are connected together by a U-shaped frame member 38 fastened to the bracket by suitable bolts. The frame member 38 extends longitudinally of the body 10 and supports a frame member 39 which extends at a right angle to the axis of body 10. A lunette 40 is attached to the front of the frame member 39 to provide a means of towing the vehicle and a pintle hook 41 is attached to the rear of the frame member 39 to facilitate tandem towing of several vehicles. Preferably the frame members 38 and 39 are strengthened by a frame member 42 extending from the brackets 37 and connected to the frame member 39 adjacent the lunette 40.

A brake disc 43 is secured to the stub axle 35 by suitable fasteners as shown in Fig. 4 of the drawings. The disc 43 rotates between braking pads 44 connected to suitable pistons 45 mounted for reciprocal movement in the cylinders 46 of the brake housing 47 which is secured to the bracket 37. The braking pads 44 are operated from the prime mover by connecting the air lines 48 of the prime mover to a conversion unit 49 as shown in the July, 1946 catalogue of Wagner Electric Corporation, St. Louis, Missouri, which converts the air pressure to hydraulic pressure with a power ratio of approximately 15 to 1. High pressure hydraulic fluid passing through the lines 50 are connected to the brake housing 47 as shown in Fig. 4 to actuate the pistons 45 whenever the brake system of the prime mover is actuated.

In order to fill the vehicle with liquid, the vehicle is positioned so that the hose 24 is at the top of the chamber 23 as shown in Fig. 2 of the drawings. With the vehicle in this position a hose 51 is connected to the valve nipple 20 by means of a valve coupler 52 as shown in Fig. 7 of the drawings. The valve coupler 52 is provided with a sleeve 53 which is elongated axially of the hose 51 so that the sleeve may be reciprocated relative to the hose after the coupler has been inserted through the stub axle 35. With the coupler 52 and sleeve 53 retracted as shown in the left hand view thereof of Fig. 7 the operator may push the coupler 52 and sleeve 53 toward the valve 20 until the balls 54 engage the annular slot 55 of the valve nipple 20. Thereafter the operator releases the sleeve 53 and the sleeve is moved forward by the spring 56 into the position shown on the right hand side of Fig. 7 of the drawings. In the coupled position, the balls 45 engage with the slot 55 and are retained in that position by the sleeve 53 and at the same time the gasket 57 bears against the surface 58 of the valve nipple 20 to effect a seal.

The valve coupler 52 and valve nipple 20 are each provided with valve stems 61 and 60 which respectively seat against the valve seats 63 and 62. As the valve coupler is attached to the valve nipple the inner ends 64 and 65 of the valve stem contact each other and retain the valves in open position against the pressure of the valve springs 66 and 67 which normally hold the valves 60 and 61 in closed position. It is seen that when the valve coupler 52 is connected to the valve nipple 20, the fluid communication is effected between the hose 24 and hose 51 through the valve nipple 20 and valve coupler 52.

A hose 68 and valve coupling 69 are provided for attachment to the valve nipple 21 which are similar in construction to the hose 51 and valve coupling 52 described above for attachment to valve nipple 20. With the valve couplings 52 and 69 connected respectively to the valve nipples 20 and 21 and with the hose 24 positioned at the top of the chamber 23 as by the dotted lines in Figs. 2 and 7, the vehicle is in condition for filling. Liquid is pumped through the hose 68 and passes through the coupling 69 and valve nipple 21, through holes 22 in the axle 14 and into the chamber 23. As the liquid fills the chamber 23 air is forced out of the chamber 23 through the hose 24, valve nipple 20, coupling 52 and to the atmosphere through the hose 51. A suitable flow meter is coupled to the hose 68 and after the predetermined capacity of the container or tire 10 has passed through the hose 68 the pump (not shown) is stopped and the hoses 51 and 68 are detached from the valve nipples 20 and 21 respectively by retracting the sleeve 53 of the valve couplings 52 and 69 and withdrawing the hoses 51 and 68 from the stub axles 35.

With the vehicle thus filled, the towing frame is attached to a prime mover by connecting the lunette 40 with the standard pintle hook on the prime mover. The "sulky" type towing frame will easily attach to a prime mover pintle at standard height without seriously affecting the towing frame or towing qualities of additional vehicles attached in tandem to each other as shown in Fig. 3 of the drawings. With the units attached in tandem as shown in Fig. 3, the air line 48 of the first unit is attached to the brake line of the prime mover and the air lines 48 on the subsequent units are, in turn, attached in series so that actuation of the brakes on the prime mover simultaneously actuates the brakes on each of the vehicles.

Since the bodies of each vehicle are inflated to a pressure of less than 15 p.s.i. and the bodies 10 when fully loaded have a large ground-contacting area, and therefore a relatively low ground-contacting pressure, very little force is required to pull the vehicle over otherwise impassable terrain. Furthermore, if the vehicles are towed in tandem they may be towed over rough, steep, sloped terrain without danger of the towing frames interfering with the rise or fall of a succeeding unit following in train.

After the vehicles have been towed to a destination such as an isolated contruction project, landing field, combat area, etc., the vehicles are emptied by stopping the vehicle with the hose 24 at the bottom of the chamber 23 as shown in Fig. 7 of the drawings. Preferably the outer surface of the flange 34 is provided with an arrow or other indicia indicating the position of the hose 24 relative to the bracket 37 or frame member 38. As shown in Fig. 2, the arrow 70 pointed downwardly relative to the bracket 37 indicates to the operator that the hose is in the position shown in Fig. 7 and the vehicle is in position to be emptied. The operator then connects hoses 68 and 51 to the corresponding valve nipples 21 and 20 and compressed air or an inert gas is introduced through the hose 68 and valve nipple 21 forcing liquid through the hose 24, valve nipple 20 and hose 51, which is connected to a suitable storage tank, vehicle to be refueled, airplane, tank, etc.

Should it be desired to transport the vehicles over a considerable distance by ship, rail, etc. the towing frame may be readily disconnected from the body 10 by simply unscrewing the bolts 33 and lifting the entire towing frame from the axle assembly and body 10. With the towing frame thus disconnected the axle assembly and bodies 10 may be readily stacked since the valve nipples are inboard of the flanges 13 which in turn are flush with the sidewalls of the body 10. Furthermore, a suitable lifting ring 71 may be secured to the outer surfaces 17 of the flanges 13 by means of bolts 33 so that the bodies 10 may be lifted by any conventional hoisting apparatus.

Although the preferred embodiments of the invention have been shown and described so that compressed air or inert gas is used to force liquid out of the body 10, it is apparent that, should the vehicle arrive at a destination without a supply of compressed air or an inert gas to force the fuel out of the chamber 23, the liquid can be pumped out of the chamber whereby the body 10 will collapse around the axle. Air may then be allowed to enter the body 10 by opening one of the valves until the chamber has reached atmospheric pressure. It is also contemplated that prior to filling the tire the tire body 10 may be collapsed by evacuating the chamber 23 so that the body 10 is collapsed about the axle and thereafter the chamber may be filled with liquid by gravity.

The preferred embodiments of the invention have also been shown and described with a single hose fitting 24, but it is contemplated that the invention also includes the addition of a hose 24a, identical to hose 24 substituted for holes 22 and connected to a fitting similar to nipple 25 located adjacent valve nipple 21 and circumferentially 180° from the hose 24 and nipple 25 as illustrated in Fig. 5 so that the distance required to position the vehicle prior to filling or emptying would be cut in half.

While certain representative embodiments and details have been shown for the purpose of illustrating the invention, it will be apparent to those skilled in this art that various changes and modifications may be made therein without departing from the spirit or scope of the invention.

We claim:

1. A vehicle for transporting and storing fluid comprising in combination an axle assembly comprising a rigid elongated main axle having radially extending flanges at each end thereof, a flexible, inflatable, elongated body having sidewalls secured to said flanges to form a fluid-tight chamber, a normally closed first valve secured to said axle assembly through which fluid may be injected into said chamber, a normally closed second valve secured to said axle assembly and communicating with one end of a flexible tube located internally of said chamber, the other end of said flexible tube contacting the inner surface of said body so that air may be vented from said chamber through said flexible tube and second valve while liquid is being injected into said chamber, said valves being disposed inboard of the axially outer face of said flanges, a pair of conduits, each having one end terminating externally of the chamber, coupling means at the opposite ends of said conduits for respectively removably connecting one of said conduits to each of said valves, each of said conduits having means at the said opposite end thereof for opening the respective valve to which it is connected and holding said valves in open position when connected thereto.

2. A vehicle as claimed in claim 1 in which a stub axle is removably secured to each of said flanges, a pair of supporting brackets, the outer ends of said stub axles being journaled respectively within one of said supporting brackets, said brackets being joined together by a towing frame.

3. A vehicle as claimed in claim 1 in which a stub axle is removably secured to each of said flanges, a pair of brackets, an end of each of said stub axles being journaled respectively within one of said brackets, said brackets being connected together by a towing frame, a brake disk secured to each of said stub axles and brake means supported by said brackets cooperating with said braking disk.

4. A vehicle as claimed in claim 1 in which said main axle of said axle assembly is hollow and a hollow stub axle is removably secured to each of said flanges, said stub axles being connected together by and journaled within a towing frame, said conduits projecting respectively through one of said stub axles and into one end of said main axle for engagement with said valve coupling means.

5. A vehicle as claimed in claim 1 in which said main axle of said axle assembly is hollow and said flexible tube projects from said main axle at an acute angle relative to said main axle, the outer end of said tube contacting the radially inner side of said body tangentially.

6. A vehicle for transporting and storing fluid comprising in combination an elongated hollow rigid axle having radially extending flanges at each end thereof, a flexible, inflatable, elongated body having sidewalls secured to said flanges to form a fluid-type chamber, a normally closed first valve disposed within and adjacent one end of said axle through which fluid may be injected into said chamber, a normally closed second valve disposed within and adjacent the other end of said axle and comunicating with one end of a flexible tube located internally of said chamber, the other end of said tube contacting the inner surface of said body so that air may be vented from said chamber through said tube and second valve while liquid is being injected in the said chamber, a plug disposed within said hollow axle between said first and second valves, said axle having a perforation between said plug and said first valve, said valves being disposed inboard of the axially outer face of said flanges, a pair of conduits, each having one end terminating externally of the chamber, coupling means at the opposite ends of said conduits for respectively removably connecting one of said conduits to each of said valves, each of said conduits having means at the said opposite end thereof for opening the respective valve to which it is connected and holding said valves in open position when connected thereto.

References Cited in the file of this patent

UNITED STATES PATENTS

| Re. 24,272 | Albee | Feb. 12, 1957 |
| 1,989,573 | Von Lontzkoy | Jan. 29, 1935 |
| 2,541,928 | Loomis | Feb. 13, 1951 |
| 2,548,190 | Arpin, Jr. | Apr. 10, 1951 |
| 2,795,257 | Cunningham | June 11, 1957 |

OTHER REFERENCES

Publication "Flight," May 18, 1956, page 624 (lower right-hand corner of the page).